United States Patent [19]

Betts, Sr.

[11] 3,999,776

[45] Dec. 28, 1976

[54] SPRING-TYPE MUD FLAP HOLDERS

[75] Inventor: William M. Betts, Sr., Piedmont, Calif.

[73] Assignee: William M. Betts, Jr., Piedmont, Calif.

[22] Filed: Sept. 19, 1975

[21] Appl. No.: 614,835

[52] U.S. Cl. .......................... 280/154.5 R; 248/204
[51] Int. Cl.² ......................................... B62D 25/16
[58] Field of Search ............ 280/154.5 R; 343/715, 343/888; 52/110; 248/204

[56] References Cited

UNITED STATES PATENTS 2,660,453  11/1953  Russel et al. ............... 280/154.5 R
2,771,604  11/1956  Goldstein ........................... 343/888

Primary Examiner—Robert R. Song
Attorney, Agent, or Firm—Naylor, Neal & Uilkema

[57] ABSTRACT

A tightly coiled spring having high initial tension has one end thereof press-fitted over a hub member attached to the chassis and the other end thereof press-fitted over another hub member from which there extends a flap holder support arm.

3 Claims, 5 Drawing Figures

SPRING-TYPE MUD FLAP HOLDERS

The present invention constitutes an improvement over the spring mud flap holders shown in U.S. Pat. No. 2,970,849, which was issued to me on Feb. 7, 1961.

The essential object of the present invention is to provide a spring mounting for a permanent flap holder which may bend equally well in both horizontal and vertical directions while preventing the flap holding arm from receiving any permanent set or deformation in normal usage.

Other objects and advantages of the invention will be apparent from the following description taken in conjunction with the drawing forming part of this specification, and in which.

Figure 1:
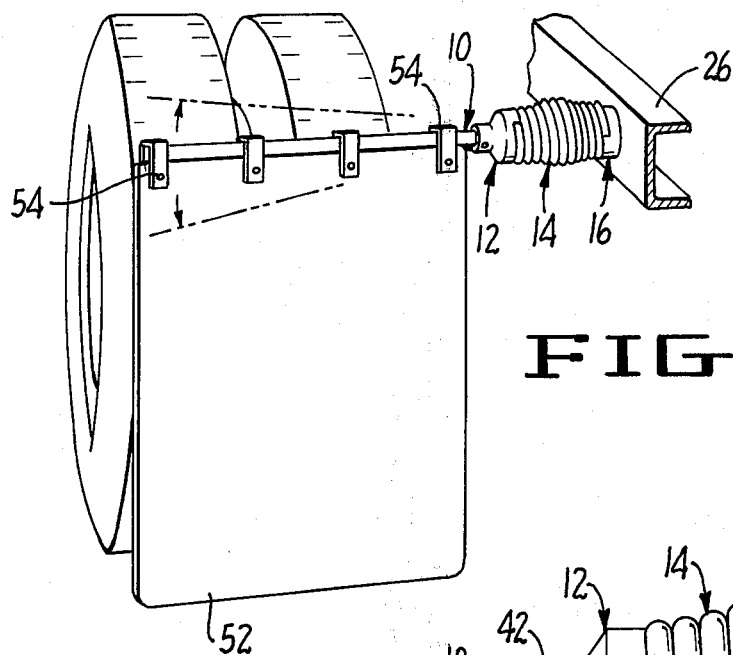
FIG. 1 is a view in perspective of the flap holder of the invention installed on a truck chassis.
Figure 2:
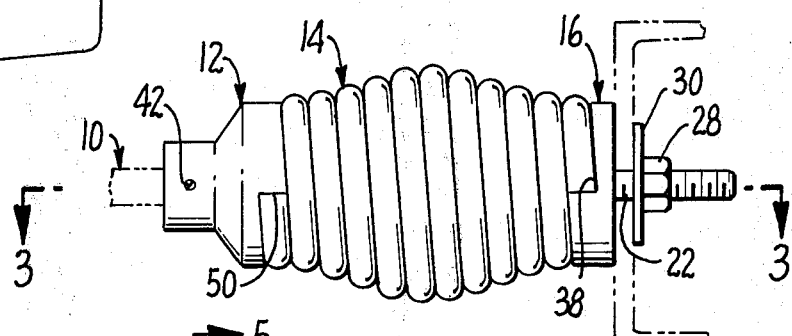
FIG. 2 is an enlarged partial view in elevation of the spring portion of the subject flap holder.

The flap holder comprises a flap holder rod 10, hub member 12, spring 14, and hub member 16.

The hub member 16 is provided with a tapered socket 18 into which the head 20 of bolt 22 is press-fitted. The threaded stem of the bolt 22 passes with slight clearance through the bore 24 formed in the hub 16. The bolt is passed through an aperture formed in the channel member 26 of the truck chassis. Nut and washer elements 28 and 30 secure the hub member 16 to the channel member 26.

Figure 3:
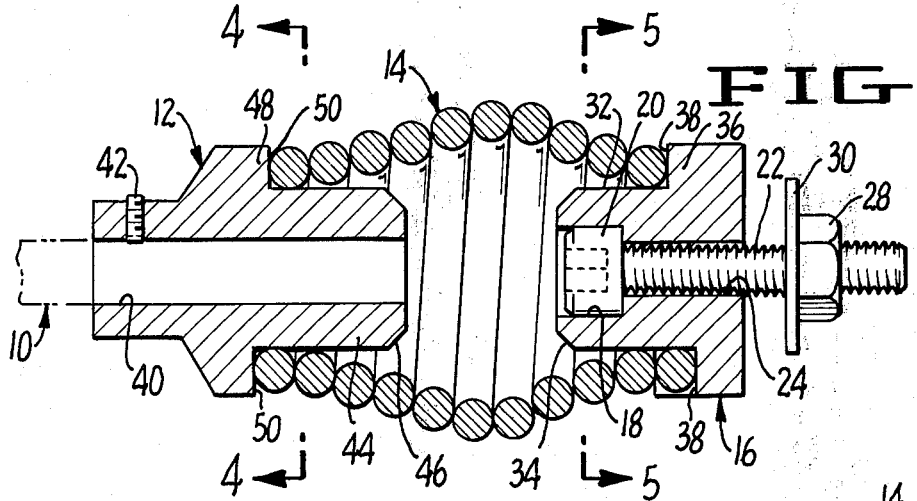
FIG. 3 is an enlarged view in section taken along lines 3—3 of FIG. 2.
Figure 4:
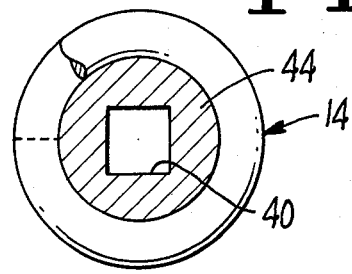
FIG. 4 is a view in section taken along lines 4—4 of FIG. 3.
Figure 5:
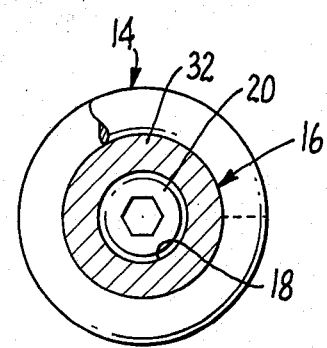
FIG. 5 is a view in section taken along lines 5—5 of FIG. 3.

The spring 14 is tightly wound with high initial tension from heavy guage steel wire in the form of a helical spring. The spring has a large diameter middle portion where spring bending takes place, the mid-portion being disposed between the spaced apart adjacent ends of the two hubs 12 and 16, as shown in FIG. 3. The connection between hub 16 and the spring is accomplished by the press-fitting of the reduced diameter inner end 32 of hub 16 into the spring. The hub end 32 is provided with an annular camming surface 34 to enable the press-fit connection to be made. Hub 16 has a spring support shoulder 36 which is formed with a spiralled face 38 which is complemental to the angle of the spring helix.

Hub 12 is provided with a passageway 40 which is square in cross-section and complemental to rod 10. A set screw 42 serves to retain the rod and hub in connected relation. At its inner end the hub 12 is provided with an inner end portion of reduced diameter which has a press-fit connection with the spring, for which purpose the hub end is provided with an annular camming surface 46. Hub 12 is also provided with a shoulder 48 having a spiralled surface 50 which, like the surface 38 of the other hub 16, is formed at an angle matching the lead angle of the helical spring 14.

The rod 10 is preferably formed of square steel bar stock. The flexible mud flap 52 is secured to the rod by a number of hanger clips 54, the outer one of which is preferably welded to the rod.

Due to the nature of the spring mounting the rod 10 may with practically equal facility be deflected either horizontally or vertically or along a path having both horizontal and vertical components, as is intended to be indicated by the dotted flexure-indicating lines in FIG. 1. As indicated above, the spring 14 is the least resistant to bending at its largest diameter mid-portion where bending may take place without being impeded by the hub members 12 and 16. Any substantial degree of bending of the spring is accompanied by a breaking away of one turn of the spring from its adjacent turn in the large mid-region of the spring.

The subject flap holders are particularly resistant to the taking on of any permanent set or deformation under the stress and strain of a truck being backed even roughly into loading docks and so forth.

What is claimed is:

1. A flap holder for trucks and the like comprising a helical spring shaped and wound to have high initial tension, a first hub member having one end attached to one end of said spring and having connector means at its other end for attachment to a truck, a second hub member having one end attached to the other end of said spring and having a flap hanger rod removably connected to the other end thereof, said hub members having ends of reduced diameter extending into the ends of said spring, and said hub members being provided with shoulders having spirally formed surfaces complementally engaging the ends of said spring.

2. The flap holder of claim 1, said spring having a mid-portion of relatively large diameter and being tapered therefrom to have ends of relatively small diameter to which said hub members are attached, said hub members terminating short of said mid-portion of said spring.

3. The flap holder of claim 2, said connector means comprising a bolt extending from said first hub and having its head jammed into a tapered socket formed in said hub.

* * * * *